(12) United States Patent
Humm et al.

(10) Patent No.: US 11,519,619 B2
(45) Date of Patent: *Dec. 6, 2022

(54) POSITIONING SYSTEM AND METHOD FOR DETERMINING THE POSITION OF FANS

(71) Applicant: ebm-papst Mulfingen GmbH & Co. KG, Mulfingen (DE)

(72) Inventors: Markus Humm, Weissbach (DE); Alexander Rau, Leingarten (DE); Christian Antonius Knipp, Aspach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 239 days.

This patent is subject to a terminal disclaimer.

(21) Appl. No.: 16/910,171

(22) Filed: Jun. 24, 2020

(65) Prior Publication Data
US 2020/0400329 A1 Dec. 24, 2020

(30) Foreign Application Priority Data

Jun. 24, 2019 (DE) .................... 10 2019 116 871.6
Jun. 24, 2019 (DE) .................... 20 2019 103 476.9

(51) Int. Cl.
| | | |
|---|---|---|
| *F24F 11/49* | (2018.01) | |
| *F24F 7/007* | (2006.01) | |
| *F24F 11/77* | (2018.01) | |
| *F24F 11/30* | (2018.01) | |
| *F04D 25/16* | (2006.01) | |
| *G01D 7/10* | (2006.01) | |
| *F24F 3/167* | (2021.01) | |
| *G01H 1/00* | (2006.01) | |

(52) U.S. Cl.
CPC ............ *F24F 11/30* (2018.01); *F04D 25/166* (2013.01); *F24F 7/007* (2013.01); *F24F 11/49* (2018.01); *F24F 11/77* (2018.01); *G01D 7/10* (2013.01); *F24F 3/167* (2021.01); *G01H 1/003* (2013.01)

(58) Field of Classification Search
CPC .................................. G01D 7/10; F24F 11/49
See application file for complete search history.

(56) References Cited

U.S. PATENT DOCUMENTS

| | | | |
|---|---|---|---|
| 6,592,449 B2 * | 7/2003 | Cipolla | ................. F04D 27/004 361/679.48 |
| 9,732,759 B2 * | 8/2017 | Chen | ..................... F04D 27/004 |
| 10,004,162 B2 * | 6/2018 | Bailey | ................ H05K 7/20736 |
| 2020/0300490 A1 * | 9/2020 | Wystup | .................... F24F 7/007 |

* cited by examiner

*Primary Examiner* — Steven S Anderson, II

(74) *Attorney, Agent, or Firm* — Harness, Dickey & Pierce, P.L.C.

(57) ABSTRACT

A method for determining the positions of a number of fans ($V_{n,m}$) for generating an air flow in a preferably enclosed space. The fans ($V_{n,m}$) have an acceleration sensor to determine their position. The fans ($V_{n,m}$) are arranged in rows ($R_1, R_2, \ldots, R_n$) and columns ($S_1, S_2, \ldots, S_m$). At least the position (i, j) of one fan ($V_{i,j}$) is known.

20 Claims, 6 Drawing Sheets

POSITIONING SYSTEM AND METHOD FOR DETERMINING THE POSITION OF FANS

CROSS-REFERENCE TO RELATED APPLICATION

Figure 1:
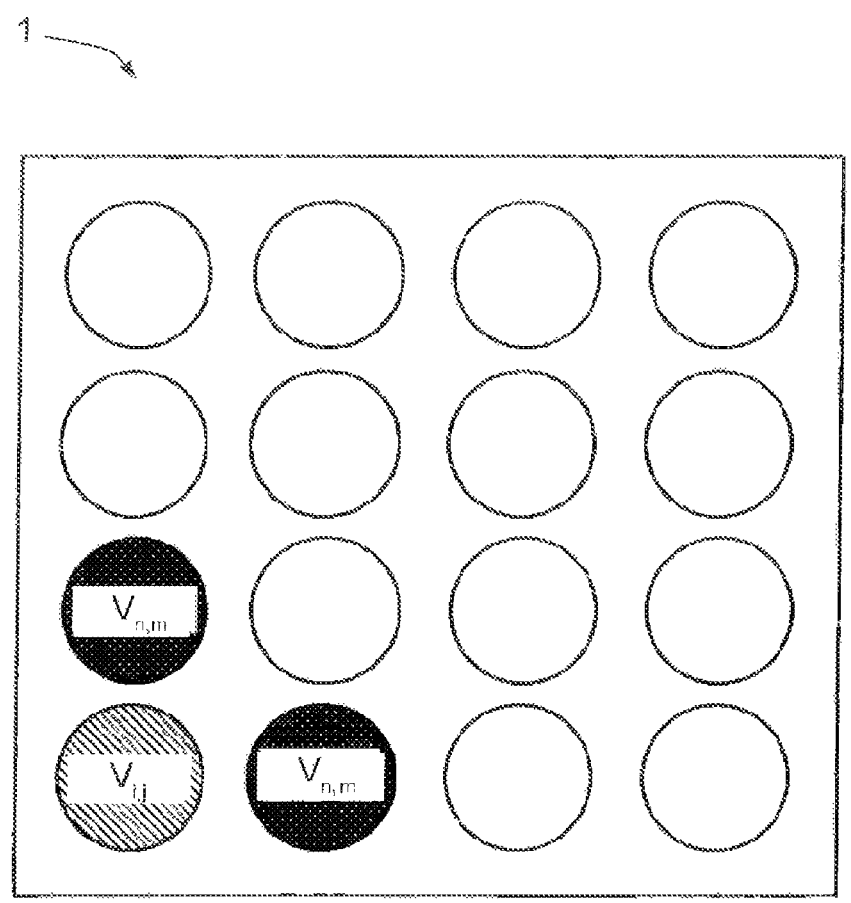

This application claims priority to German Application No. 10 2019 116 871.6, filed Jun. 24, 2019 and German Utility Model Application No. 20 2019 103 476.9, filed Jun. 24, 2019. The disclosures of the above applications are incorporating herein by reference.

FIELD

The disclosure relates to a positioning system and a method for determining the position of fans.

BACKGROUND

It is necessary to determine the position of fans installed within a network in a clean room, for example, to represent the fans in a layout plan of the room.

Modules called filter fan units (FFUs) are used in buildings. Such a module typically has a fan and a filter. The fan takes in air from above and blows it through the filter into the room. Its purpose is permanent filtering of the ambient air. On the outlet side, the air flow is optionally guided in a turbulent and laminar manner. In the laminar variant, air flows are paralleled by means of air baffles. This creates a laminar air flow from the FFU to the floor of the room.

Filter fan units are primarily found in ceiling systems of clean and ultra clean rooms. They are found in semiconductor production, the microsystems industry, the pharmaceutical and food industries. A larger number of filter fan units (FFU) is typically installed in rows and columns in a clean room ceiling. Each FFU is responsible for a specific portion of the clean room. Each FFU can be individually controlled using a central computer. This principle makes it possible to specify individual setpoint values for temperature and air flow (fan speed) for each portion of a clean room covered by an FFU. An FFU that is located above a heat generating machine will deliver somewhat cooler air, for example. In this manner, a uniform temperature gradient and a uniform air flow are generated throughout the clean room. At the same time, energy demand is reduced. The exact positions of the fans in the network are needed in order to trigger them by means of the controller in a fan plan in a room layout plan. this enables an easy determination of their position in the event of a fault and reduces the monitoring and maintenance effort in this manner.

Various approaches are known from the prior art to perform such positioning and to represent the determined positions of the fans or FFUs in a room layout plan, particularly a spatial network map or to transfer these positions thereto. Conventionally, a spatial network map is created with a wiring diagram. The fans are drawn into the digital room layout plan and must be installed and connected in the sequence specified. This is a comparatively major effort because it must always be ensured during installation that a fan with a specified network address is installed at the correct position.

Alternatively, the prior art includes the option to determine the position of each fan using GPS technology and to transfer the GPS position to a write register in the fan. For this purpose, however, the controller must be configured such that it can read out these network addresses and the position from the register to transfer the position to a room layout plan. Furthermore, a GPS signal is often not available in a clean room.

It is also conceivable to provide the address for reading out in the form of an address label or barcode in alphanumeric representation on the device. After installing a respective fan (or FFU, respectively), the associated label with the specified, predetermined position is adhered to the fans or FFU and then scanned. This entails the risk that incorrect assignments are made, particularly for a larger number of fans, and a major correction effort is needed to detect these incorrect assignments.

SUMMARY

It is the underlying problem of the disclosure to overcome the disadvantages mentioned above and provide an optimized and improved method, as well as, a respective device for determining the position of fans, particularly, of fans arranged in a room.

This problem is solved by the method for determining the positions of a number of fans for generating an air flow in a preferably enclosed space. The fans have an acceleration sensor to determine their position. The fans are arranged in rows and columns. At least the position (i, j) of one fan ($V_{i,j}$) is known. The method comprising the following steps:
 a) driving the at least one fan ($V_{i,j}$), the position of which is known, in order to initiate an attenuated oscillation of at least those fans ($V_{n,m}$) that are arranged in an adjacent row or column position, respectively;
 b) detecting the attenuated oscillation of the fans ($V_{n,m}$) that are oscillating in this manner by a mechanical coupling using a detector and controller and determining the potential neighborhood positions of these fans based on an iterative exclusion algorithm,
 c) repeating the steps a) and b) for the fans ($V_{n,m}$) determined, respectively, according to step b) until all positions (n,m) of the fans have been determined.

According to the disclosure, a method is proposed for determining the position of a number of fans $V_{n,m}$ for generating an air flow in a preferably enclosed space. The fans $V_{n,m}$ have an acceleration sensor to determine their position. The fans are preferably arranged in rows and columns. The position of at least one fan $V_{i,j}$ is known as the reference position. The method further comprises the following steps:
 a) driving the at least one fan $V_{i,j}$, the position of which is known, to initiate an attenuated oscillation at least of fans $V_{n,m}$ arranged immediately adjacent in a row and column position. Immediately means, in this context, that no other fan is arranged in the space between the affected fan and the fan with the known position;
 b) detecting the attenuated oscillation of the fans $V_{n,m}$ that are oscillating in this manner by a mechanical coupling using a detector and controller. and determining the potential neighborhood positions of these fans $V_{n,m}$ based on an iterative exclusion algorithm,
 c) wherein the steps a) and b) are repeated for the fans $V_{n,m}$ determined, respectively, according to step b) until all positions of the fans $V_{n,m}$ have been determined.

The operational concept of the disclosure is described below.

The fans can, for example, be arranged in a suspended ceiling of a clean room. A fan with a known absolute spatial position is deliberately driven by its own drive, e.g., such as an EC motor. This generates an oscillation in immediately adjacent fans that have the smallest distance to the fan with the known position. This oscillation occurs due to an installation-related mechanical coupling, particularly between the immediately adjacent fans and the fan deliberately driven by its own drive. The attenuated oscillation induced in this manner can be detected by means of the integrated oscillation detector, such as a MEMS acceleration sensor. The fan that detects the highest point of the oscillation must therefore be in the immediate neighborhood of the already known fan. For this purpose, the fans are arranged in a rectangular or square array. Adjacent fans are arranged in a row. These fans can be divided into rows and columns, that are preferably arranged at a right angle to each other. For the exact determination of the position in a square or rectangular arrangement of multiple fans, at least two deliberately driven fans having an exact, unknown position must be arranged immediately adjacent to, or at a small distance from, the fan. It is insignificant in this context if the position of the fan with an unknown position needed for determining positions was known before or if it was only determined by the described method. As soon as an intersection point is created, that is, two fans with known positions excite oscillation in a common fan in the immediate vicinity, the position of the latter can be determined relative to the fans with absolutely known positions.

In an advantageous embodiment, the fan $V_{i,j}$, with a known position in step a), is driven at a maximum degree of activation. The position of the fan $V_{i,j}$, is set to the known position. This creates a sufficiently high pressure difference for externally driving the adjacent fans.

Furthermore, in a preferred embodiment, the measuring of the oscillation in step b) of the fans $V_{n,m}$ oscillating by the generated attenuated oscillation and the transmission of the data to the controller is performed by the acceleration sensors. Since an attenuated oscillation of the fans $V_{n,m}$ is registered, these fans can be identified as externally-induced oscillating fans $V_{n,m}$.

In another advantageous variant, the unknown positions of all fans $V_{n,m}$ in a row and/or column, position immediately adjacent to the fan $V_{i,j}$, are determined in step b) based on the position of the excitatory fan $V_{i,j}$. The advantage is that, starting from the known position of the excitatory fan any and all unknown positions of the other fans $V_{n,m}$ can be determined in accordance with their position relative to the excitatory fan $V_{i,j}$. This means that their positions can be determined using these methods.

It is further advantageous that the fan $V_{i,j}$, with a known position, is switched to idling by the controller after step b). In this manner, the fan $V_{i,j}$, having a known position, is set to an idle state for the subsequent steps of the method.

In a preferred embodiment of the method, driving of at least two of the fans $V_{n,m}$ detected in step b) is performed at a predetermined, preferably maximum, degree of activation. The drive of one of the fans $V_{n,m}$ detected in step b), in turn, externally induces an oscillation in its adjacent fans $V_{n,m}$.

According to an embodiment of the disclosure, the unknown positions of fans $V_{n+1,m}$; $V_{n,m+1}$ located immediately adjacent to the fan $V_{n,m}$ driven in step b) are marked with the position of the driving fan $V_{n,m}$. Herein n+1 or m+1, respectively, indicate that the fan is at a position at a larger distance from the excitatory fan $V_{n,m}$ within a row or column. The marking or a bookmark function is used to indicate that an oscillation has already been externally induced in the marked fan $V_{n+1,m}$; $V_{n,m+1}$. In addition, the marking or bookmark function specifies the fan $V_{n,m}$, that externally induced an oscillation in this fan $V_{n+1,m}$; $V_{n,m+1}$. As a result, a relative position of the fan $V_{n+1,m}$; $V_{n,m+1}$ to the driven fan $V_{n,m}$ can be determined.

According to the disclosure, in step b), the driven fan $V_{n,m}$ is switched to idling after marking the adjacent fans $V_{n+1,m}$; $V_{n,m+1}$ having an unknown position. One of the other marked fans $V_{n+1,m}$; $V_{n,m+1}$ is driven at a maximum degree of activation. The steps of the method are performed successively for all fans $V_{n,m}$.

According to an advantageous embodiment of the present disclosure, the oscillation of the adjacent fans $V_{n+2,m}$; $V_{n,m+2}$ with an unknown position, that are oscillating due to the fan $V_{n+1,m}$; $V_{n,m+1}$, is determined in step b) by acceleration sensors. The data is transmitted to the controller. Since the speed of the fans $V_{n+2,m}$; $V_{n,m+2}$ is registered, these fans $V_{n+2,m}$; $V_{n,m+2}$ can once again be identified as fans externally set into oscillation.

It is further advantageously envisaged that the positions of the adjacent fans with an unknown position are marked in step b) with the position $V_{n+2,m}$; $V_{n,m+2}$ of the excitatory fan $V_{n+1,m}$; $V_{n,m+1}$. The marking or a bookmark function is used to indicate that an oscillation has already been externally induced once in the marked fan $V_{n+2,m}$; $V_{n,m+2}$. In addition, the marking or bookmark function specifies the fan $V_{n+1,m}$; $V_{n,m+1}$ that externally induced an oscillation in this fan $V_{n+2,m}$; $V_{n,m+2}$. As a result, a relative position of the fan $V_{n+2,m}$; $V_{n,m+2}$ to the driven fan $V_{n+1,m}$; $V_{n,m+1}$ can already be determined.

The method is preferably performed in such a manner that, if a fan $V_{n+1,m}$; $V_{n,m+1}$; $V_{n+2,m}$; $V_{n,m+2}$ is already marked, the position of the fan is set to a unique specific position. This results in an interface where both markings are offset against each other. It is further advantageous if the position (n, m) of the fan ($V_{n+1,m}$; $V_{n,m+1}$) is determined by comparing the indices n and m of the existing marking to ones of the newly created marking. The respective higher index represents the index for the determined position.

The respective higher value of the respective index is carried over. This intersection position yields the relative coordinates that can be multiplied by absolute values, distance between the individual fans.

Further advantageous is an embodiment where driving one of the marked fans $V_{n+1,m}$; $V_{n,m+1}$ is continued until all fans $V_{n,m}$ are determined. As a result, the complete system of fans $V_{n,m}$ is position determined with respect to the arrangement of the fans $V_{n,m}$ relative to each other.

According to the disclosure, a method is provided for determining the positions of a number of fans $V_{n,m}$ for generating an air flow in a preferably enclosed space. The fans have an acceleration sensor for positioning. The fans $V_{n,m}$ are arranged in rows and columns. At least the position of a fan $V_{i,j}$ is known. A controller is provided that is configured to activate and determine the positions of the fans $V_{n,m}$. Each of the fans $V_{n,m}$ can be indirectly set into oscillation by an adjacent fan $V_{n+1,m}$; $V_{n,m+1}$. The method comprising the following steps:

a. driving the fan $V_{i,j}$, with a known position at a maximum degree of activation and setting the position of the fan to the known position;

b. measuring the attenuated oscillation of the fans $V_{n,m}$ oscillating due to mechanical coupling, and transmitting the data to the controller via the speed sensors;

c. determining those positions of all fans $V_{n,m}$, having unknown positions in a row and/or column position immediately adjacent to the fan $V_{i,j}$, based on the position of the excitatory fan $V_{i,j}$;

d. setting the fan $V_{i,j}$ with the known position to idling by the controller;

e. driving one of at least two of the detected fans $V_{n,m}$ at a predetermined, preferably maximum, degree of activation;

f. marking the unknown positions of fans $V_{n+1,m}$; $V_{n,m+1}$ located immediately adjacent to the fan $V_{n,m}$ driven in step f) with the position of the excitatory fan $V_{n,m}$;

g. switching the driven fan $V_{n,m}$ to idling and driving at least the second marked fan $V_{n,m}$ at a maximum degree of activation;

h. determining the speed of the oscillating adjacent fans $V_{n+1,m}$; $V_{n,m+1}$ with unknown positions driven by the second fan ($V_{n,m}$), by the acceleration sensors and transmitting the data to the controller;

i. marking the unknown positions of fans $V_{n+1,m}$; $V_{n,m+1}$ located immediately adjacent to the fan $V_{n,m}$ driven in step i) with the position of the excitatory fan $V_{n,m}$; $V_{n,m}$;

j. if a fan $V_{n+1,m}$; $V_{n,m+1}$ has already been marked in step g) or step j), respectively, determining and setting the position of the fan $V_{n+1,m}$; $V_{n,m+1}$ to a unique, specific position; and k. driving one of the fans marked in step g) or j), respectively, and repeating the steps f) to k) until all fans are determined.

According to an advantageous embodiment of the present disclosure, the position of the fan $V_{i,j}$ is set to the value "0,0". If the positions of two immediately adjacent fans $V_{n+1,m}$; $V_{n,m+1}$ are known for a fan $V_{n,m}$ and the position of another immediately adjacent fan $V_{n+1,m}$; $V_{n,m+1}$ is unknown, and if a marking of the unknown position has the value "0,0", the marking not equal to "0,0" is subsequently incremented by 1. In this manner, the positions of all fans $V_{n,m}$ can be determined that are arranged at the outer edge sections within the square arrangement of rows and columns.

In a preferred embodiment of the method, only the fans ($V_{n+1,m}$; $V_{n,m+1}$) with the highest attenuated oscillation are considered in step i) if more than the immediately adjacent fans ($V_{n+1,m}$; $V_{n,m+1}$) are set into oscillation in steps f) and l). Since, due to the external drive, the fans $V_{n+1,m}$; $V_{n,m+1}$ that are at a greater distance from the driven fan $V_{i,j}$ than the fans $V_{n,m}$ have a lower speed, the fans $V_{n,m}$ at the smallest distance from the driven fan can be uniquely determined.

According to the disclosure, the acceleration sensor for determining the attenuated oscillation of a fan $V_{n,m}$ is a MEMS acceleration sensor. It would also be conceivable to perform a back EMF measurement and to infer the fan position based on the induced voltage, as described above.

In another advantageous embodiment, at least two fans $V_{n,m}$ must be indirectly set into oscillation for exact positioning in steps f) to l).

Furthermore, an embodiment is favorable where the fans have a sound transducer for determining their position. A sound pressure generated by the at least one driven fan ($V_{i,j}$) is detected by the sound transducer. In this manner, the method can be implemented likewise on each fan using a preferably analog microphone instead of an acceleration sensor. In this case, it is not mechanical coupling that is used for transmitting an oscillation. Instead, a frequency is generated by exciting the fan. Accordingly, the frequency can be particularly well detected in the immediate vicinity as sound pressure, using a sound transducer in the fan.

Other advantageous further developments of the disclosure are disclosed in the dependent claims or are explained in more detail below with reference to the figures and together with a preferred embodiment of the disclosure.

DRAWINGS

Embodiment examples of the disclosure are described below in reference to the drawings. The disclosure is not limited to these embodiment examples. The drawings, in reference to figures, shows the basic design of the present, namely:

FIG. 1 to FIG. 6 are schematic views of an exemplary positioning system with a driven fan with a known position and two fans externally set into oscillation.

DETAILED DESCRIPTION

FIG. 1 is a schematic representation of an exemplary positioning system with a driven fan $V_{i,j}$ with a known position and two fans $V_{n,m}$ externally set into oscillation. Idling of the fans $V_{n,m}$ is activated by the controller for performing automatic position determination. In addition, the fans $V_{n,m}$ are arranged in a rectangular or square array of rows and columns. The maximum distance between the two fans is such that it is only possible to induce oscillation in them. Position determination is started based on a fan $V_{i,j}$, that is located in one of the four corners of the system. The position of this fan $V_{i,j}$ is known. The fan $V_{i,j}$ is further driven at a maximum degree of activation. Thus, the fans $V_{n,m}$ located at the smallest distance from the positionally known fan $V_{i,j}$ are externally set into oscillation.

Figure 2:
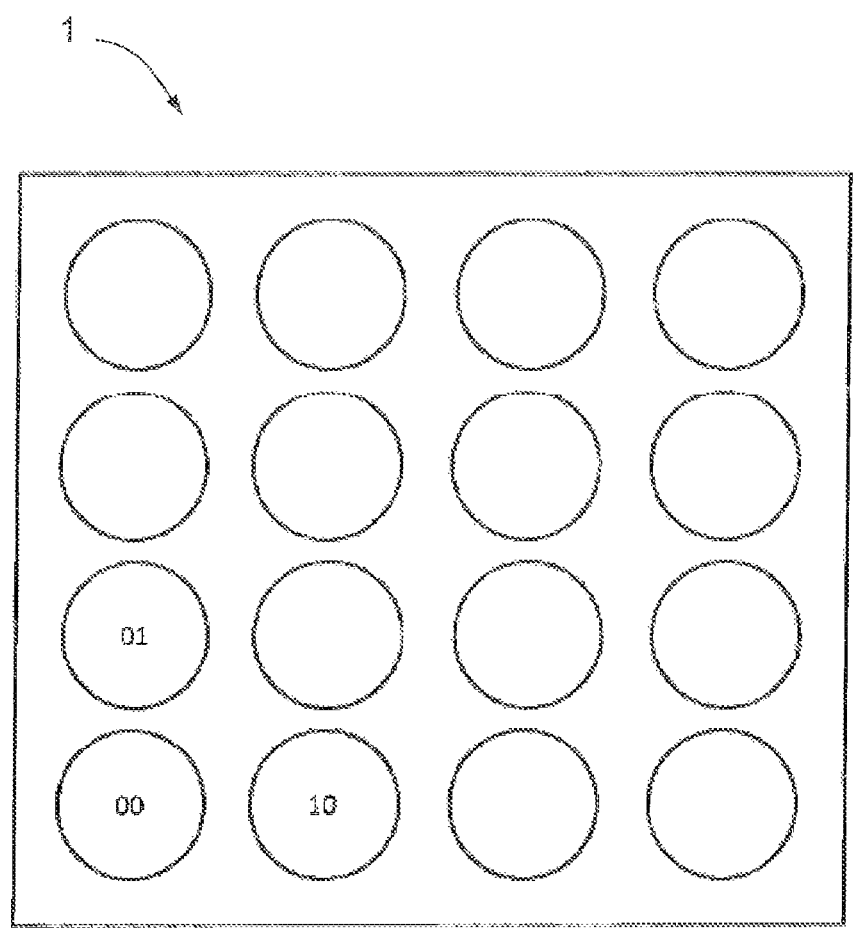

FIG. 2 shows a preliminarily determined position for the fans $V_{n,m}$ externally set into oscillation. Since other fans $V_{n,m}$ are in the environment at this point in time, that are also externally set into oscillation, unambiguous position determination is not yet possible. The positionally known fan $V_{i,j}$ is located in a corner of the system. Since the system in the first step is underdetermined, including one fan $V_{i,j}$ with a known position and two fans $V_{n,m}$ with unknown positions, an assumption must be made regarding their propagation direction. One fan $V_{n,m}$ is assigned the index "1,0" and the other fan $V_{n,m}$ is assigned the index "10". The assignment is random and describes the propagation in n- or m-direction, similar to a Cartesian coordinate system. Since, as in error propagation, this assumption is carried along through the entire method, a correction may be required at the end by switching the indices "n,m" to "n,m".

Figure 3:
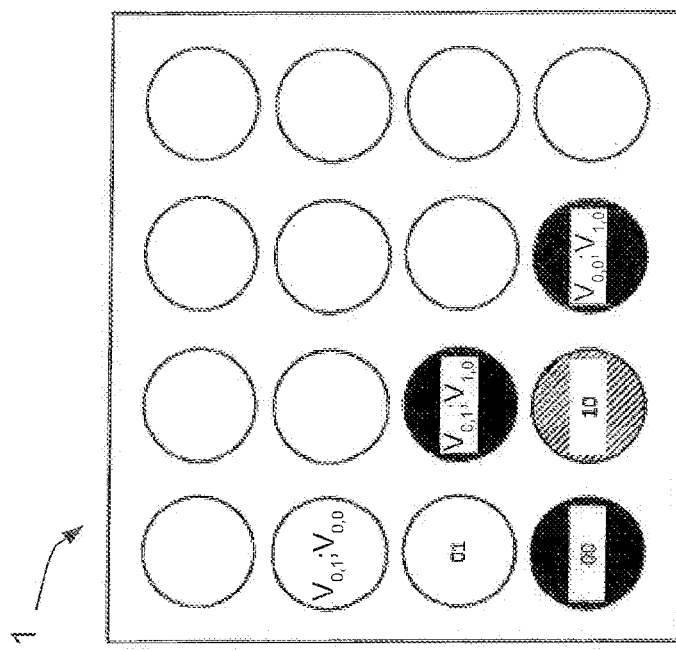
Figure 3:
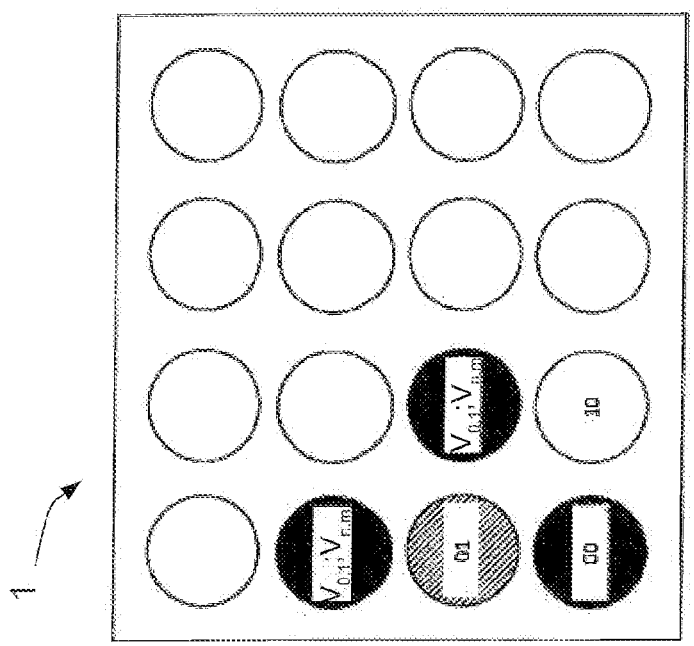

FIG. 3 shows that the newly determined fans $V_{n,m}$ are alternately also set to their own drive in the further steps of the method. This results in externally setting adjacent fans $V_{n+1,m}$; $V_{n,m+1}$ into oscillation. Each fan externally set into oscillation is once again assigned a marking that defines the fan $V_{n,m}$ that caused the external oscillation.

Figure 4:
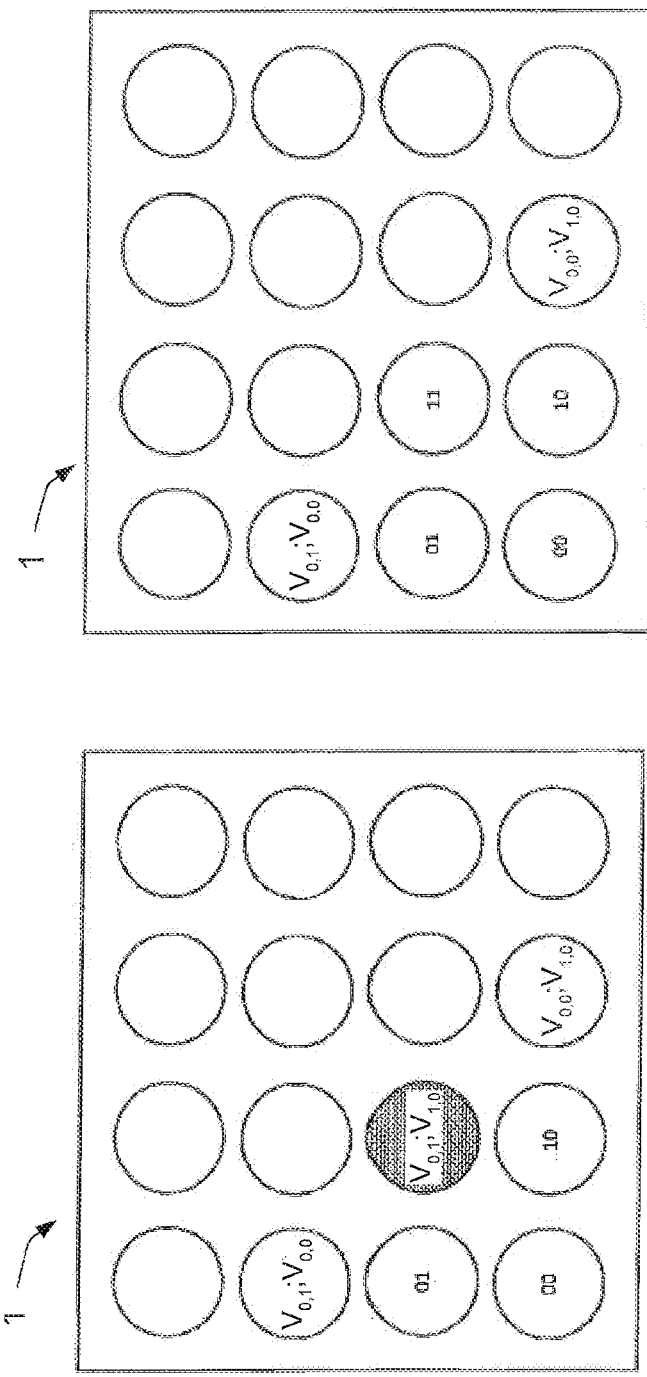

This results in the one "interface" shown in FIG. 4. For position determination, both markings are placed on top of each other, and the respective higher value of the respective index n,m is carried over.

Figure 5:
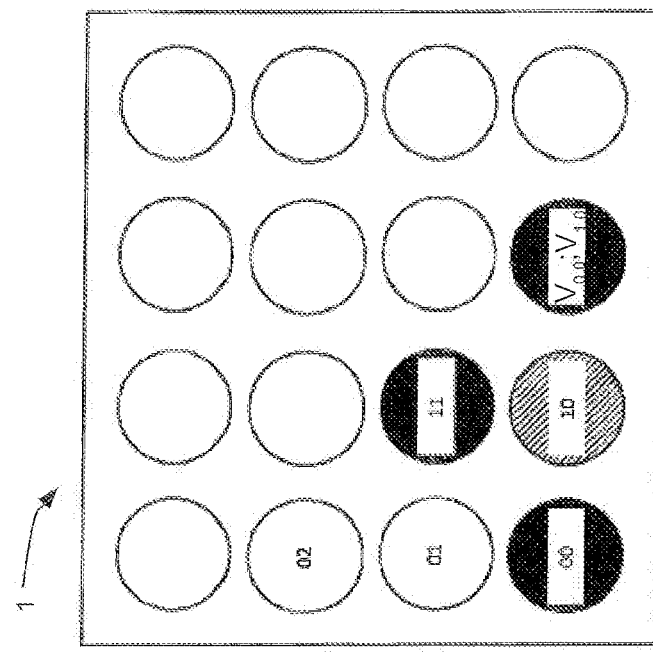
Figure 5:
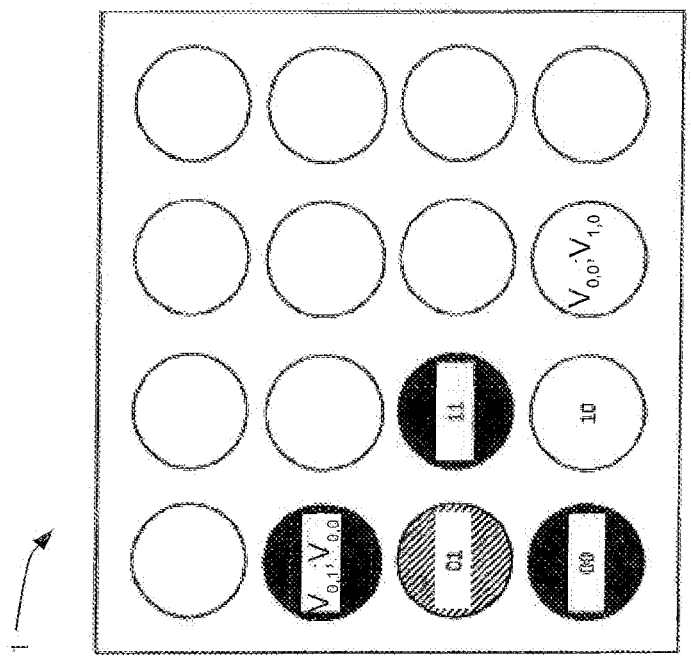

FIG. 5 shows renewed self-driving of the previously driven fans $V_{n,m}$. With this new determination, the fans on the edge can be determined uniquely based on the newly known fan $V_{n,m}$. A condition for an edge fan is defined in that two positions are known and one is unknown. But the required condition for an edge fan is that the unknown position n,m is marked "0,0". If both conditions are met, the marking not equal to "0,0" is simply incremented. The new index in this case is "0,2" or "2,0", respectively.

Figure 6:
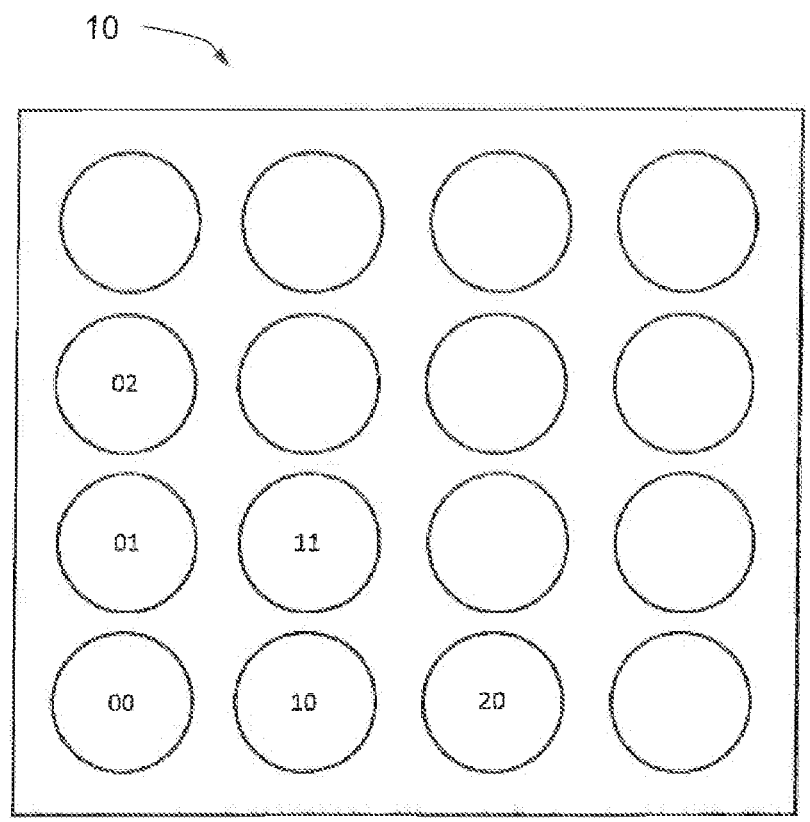

As shown in FIG. 6, the preceding steps of the method are repeated with the previously determined fans $V_{n,m}$ to determine all positions.

The figures also unambiguously show what is meant by the term "immediately adjacent." It refers to a fan the row or column index of which is offset by one position with respect to the adjacent fan, thus the positions n−1, m, n, m−1, n−1, m−1, n+1, m+1 with respect to the position n,m.

The implementation of the disclosure is not limited to the preferred embodiments described above. Instead, a plurality of variants is conceivable where the solution described is used for completely different designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for determining the positions of a number of fans for generating an air flow in an enclosed space, that have an acceleration sensor for determining their position, the fans are arranged in rows and columns, wherein at least the position (i, j) of one fan ($V_{i,j}$) is known, the method comprising the following steps:
   a) driving the at least one fan ($V_{i,j}$), the position of which is known, in order to initiate an attenuated oscillation of at least those fans ($V_{n,m}$) that are arranged in an adjacent row or column position, respectively;
   b) detecting the attenuated oscillation of the fans ($V_{n,m}$) that are oscillating in this manner by a mechanical coupling using at least one of the acceleration sensors and controller and determining the potential neighborhood positions of these fans based on an iterative exclusion algorithm;
   c) repeating the steps a) and b) for the fans ($V_{n,m}$) determined, respectively, according to step b) until all positions (n,m) of the fans have been determined.

2. The method according to claim 1, wherein the fan (Vij), with a known position, is driven in step a) at a predetermined degree of activation and the position (i,j) of the fan (Vij) is set to the known position (i,j).

3. The method according to claim 1, wherein measuring the oscillation in step b) of the fans ($V_{n,m}$) oscillating due to the generated attenuated oscillation and transmission of the data to the controller is performed by the acceleration sensors.

4. The method according to claim 1, wherein the determining of those positions (n, m) of all fans ($V_{n,m}$) having an unknown position in a row and/or column position immediately adjacent to the fan ($V_{i,j}$) is implemented in step b) based on the position of the excitatory fan ($V_{i,j}$).

5. The method according to claim 1, wherein the fan ($V_{i,j}$) with a known position, is switched to idling by the controller after step b).

6. The method according to claim 1, wherein driving of at least two of the fans (Vn,m) detected in step b) is performed at a predetermined degree of activation.

7. The method according to claim 1, wherein the unknown positions (n+1, m; n, m+1) of fans ($V_{n+1,m}$; $V_{n,m+1}$) located immediately adjacent to the fan ($V_{n,m}$) driven in step b) are marked with the position of the excitatory fan ($V_{n,m}$).

8. The method according to claim 1, wherein the driven fan (Vn,m) is switched to idling in step b) after marking the adjacent fans (Vn+l,m; Vn,m+i) having an unknown position, and one of the other marked fans (Vn+1,m; Vn,m1) is driven at a predetermined degree of activation.

9. The method according to claim 1, wherein, in step b), the oscillation of the adjacent fans (Vn+2, m; Vn,m+2) having an unknown position, that are oscillating due to the fan (Vn+l,m; Vn,m+i), is determined by the acceleration sensors, and the data is transmitted to the controller.

10. The method according to claim 1, wherein the positions (n+2, m; n, m+2) of the adjacent fans, having an unknown position, are marked in step b) with the position (Vn+2, m; Vn,m+2) of the excitatory fan (Vn+i, m; Vn,m+1).

11. The method according to claim 10, wherein, if a fan ($V_{n+1,m}$; $V_{n,m+1}$; $V_{n+2,m}$; $V_{n,m+2}$) is already marked, the position (n+1, m; n, m+1; n+2, m; n, m+2) of the fan is set to a unique specific position (i, j).

12. The method according to claim 8, wherein driving one of the marked fans ($V_{n+1,m}$; $V_{n,m+1}$) is continued until all fans ($V_{n,m}$) are determined.

13. The method for determining the positions of a number of fans ($V_{n,m}$) for generating an air flow in an preferably enclosed spaces, the fans have an acceleration sensor for position determination, the fans ($V_{n,m}$) are arranged in rows and columns, wherein at least the position (i, j) of one fan (Vij) is known, a controller is provided that is configured to activate and determine the positions of the fans ($V_{n,m}$), wherein each of the fans ($V_{n,m}$) can be indirectly set into oscillation by a fan (Vn+l,m; Vn,m+i) in an adjacent row and column position, the method comprising the following steps: a. driving the fan (Vij) having a known position at a predetermined degree of activation and setting the position (i, j) of the fan (Vij) to the known position (i, j); b. measuring the attenuated oscillation of the fans ($V_{n,m}$) oscillating due to mechanical coupling and transmitting the data to the controller by the acceleration sensors; c. determining those positions (n, m) of all fans ($V_{n,m}$) having unknown positions in a row and/or column position immediately adjacent to the fan (Vij) based on the position of the excitatory fan (Vi,j); d. switching the fan (Vij), having a known position, to idling by the controller, e. driving one of at least two of the detected fans ($V_{n,m}$) at a predetermined degree of activation; f. marking the positions (n+1, m; n, n,m+1) of fans (Vn+1,m; Vn,m+i), having unknown positions located immediately adjacent to the fan ($V_{n,m}$) driven in step f) with the position of the excitatory fan ($V_{n,m}$); g. switching the driven fan ($V_{n,m}$) to idling and driving at least the second marked fan ($V_{n,m}$) at a predetermined degree of activation; h. determining the speed of the adjacent fans (Vn+l,m; Vn,m+i) having unknown positions, oscillating due to the second fan ($V_{n,m}$) by the acceleration sensors and transmitting the data to the controller; i. marking the positions (n+1, m; n, m+1) of fans (Vn+l,m; Vn,m+i), having unknown positions, located immediately adjacent to the fan ($V_{n,m}$) driven in step i) with the position of the excitatory fan (Vn,m; Vn,m); j. if a fan (Vn+1,m; Vn,m+i) has already been marked in step g) or step j), respectively, determining and setting the position (n, m) of the fan (Vn+1,m; Vn,m+i) to a unique, specific position (n, m); and k. driving one of the fans marked in step g) or j), respectively, and repeating the steps f) to k) until all fans ($V_{n,m}$) are determined.

14. The method according to claim 13, wherein the position (n, m) of the fan ($V_{n+1,m}$; $V_{n,m+1}$) in step k) is determined by comparing the indices n and m of an existing marking to the newly created marking, wherein the respective higher index represents the index for the determined position (n, m).

15. The method according to claim 13, wherein the position (i, j) of the fan ($V_{i,j}$) is set to the value "0,0", and if the positions (n+1, m; n,m+1) of two immediately adjacent fans ($V_{n+1,m}$; $V_{n,m+1}$) are known for a fan ($V_{n,m}$) and the position (n+1, m; n,m+1) of another immediately adjacent fan ($V_{n+1,m}$; $V_{n,m+1}$) is unknown, and if a marking of the unknown position has the value "0,0", the marking not equal to "0,0" is subsequently incremented by 1.

16. The method according to claim 13, wherein only the fans ($V_{n+1,m}$; $V_{n,m+1}$) having the highest attenuated oscillation are considered in step i) if more than the immediately adjacent fans ($V_{n+1,m}$; $V_{n,m+1}$) are set into oscillation in steps f) and I).

17. The method according to claim 13, wherein the acceleration sensor for determining the attenuated oscillation of a fan ($V_{n,m}$) is a MEMS acceleration sensor.

18. The method according to claim 13, wherein at least two fans ($V_{n,m}$) must be indirectly set into oscillation for exact positioning in steps f) to I).

19. The method according to claim 1, wherein the fans further comprising a sound transducer for determining their position with the acceleration sensor and a sound pressure generated by the at least one driven fan ($V_{i,j}$) is detected by the sound transducer.

20. A method for determining the positions of a number of fans for generating an air flow in an enclosed space, that have a sound transducer for determining their position, the fans are arranged in rows and columns, wherein at least the position (i, j) of one fan (Vij) is known, the method comprising the following steps: a) driving the at least one fan (Vij), the position of which is known, in order to initiate a sound pressure of at least those fans ($V_{n,m}$) that are arranged in an adjacent row or column position, respectively; b) detecting the sound pressure of the fans ($V_{n,m}$) that are rotating in this manner by a mechanical coupling using at least one of the sound transducers and controller and determining the potential neighborhood positions of these fans based on an iterative exclusion algorithm; c) repeating the steps a) and b) for the fans ($V_{n,m}$) determined, respectively, according to step b) until all positions (n,m) of the fans have been determined.

* * * * *

UNITED STATES PATENT AND TRADEMARK OFFICE
CERTIFICATE OF CORRECTION

PATENT NO. : 11,519,619 B2
APPLICATION NO. : 16/910171
DATED : December 6, 2022
INVENTOR(S) : Markus Humm et al.

It is certified that error appears in the above-identified patent and that said Letters Patent is hereby corrected as shown below:

In the Claims

Column 7
Line 44, Claim 2          delete "(Vij)," and insert --($V_{i,j}$),--
Line 46, Claim 2          delete "(Vij)" and insert --($V_{i,j}$)--
Line 62, Claim 6          delete "(Vn,m)" and insert --($V_{n,m}$)--

Column 8
Line 2, Claim 8           delete "(Vn,m)" and insert --($V_{n,m}$)--
Line 3, Claim 8           delete "(Vn+l,m; Vn,m+i)" and insert --($V_{n+1,m}$; $V_{n,m+1}$)--
Line 4, Claim 8           delete "(Vn+1,m; Vn,m1)" and insert --($V_{n+1,m}$; $V_{n,m+1}$)--
Line 7, Claim 9           delete "(Vn+2, m; Vn,m+2)" and insert --($V_{n+2,m}$; $V_{n,m+2}$)--
Line 9, Claim 9           delete "(Vn+l,m; Vn,m+i)," and insert --($V_{n+1,m}$; $V_{n,m+1}$),--
Line 14, Claim 10         delete "(Vn+2, m; Vn,m+2)" and insert --($V_{n+2,m}$; $V_{n,m+2}$)--
Lines 14-15, Claim 10     delete "(Vn+i, m; Vn,m+1)." and insert --($V_{n+1,m}$; $V_{n,m+1}$).--
Line 17, Claim 11         after "($V_{n+1,m}$;", delete "¶"
Line 25, Claim 13         after "air flow in an", delete "preferably"
Line 29, Claim 13         delete "(Vij)" and insert --($V_{i,j}$)--
Line 32, Claim 13         delete "(Vn+l,m; Vn,m+i)" and insert --($V_{n+1,m}$; $V_{n,m+1}$)--
Line 34, Claim 13         after "steps:", insert --¶--
Line 34, Claim 13         delete "(Vij)" and insert --($V_{i,j}$)--
Line 36, Claim 13         delete "(Vij)" and insert --($V_{i,j}$)--
Line 36, Claim 13         after "(i, j);", insert --¶--
Line 39, Claim 13         after "sensors;", insert --¶--
Line 42, Claim 13         delete "(Vij)" and insert --($V_{i,j}$)--
Line 42, Claim 13         delete "(Vi,j);" and insert --($V_{i,j}$);¶--
Line 43, Claim 13         delete "(Vij)," and insert --($V_{i,j}$),--
Line 44, Claim 13         after "controller,", insert --¶--
Line 45, Claim 13         after "activation;", insert --¶--
Line 46, Claim 13         delete "n,m+1)" and insert --n, m+1)--

Signed and Sealed this
Ninth Day of May, 2023

*Katherine Kelly Vidal*
Katherine Kelly Vidal
*Director of the United States Patent and Trademark Office*

CERTIFICATE OF CORRECTION (continued)
U.S. Pat. No. 11,519,619 B2

| | |
|---|---|
| Lines 46-47, Claim 13 | delete "(Vn+l,m; Vn,m+i)," and insert --($V_{n+1,m}$; $V_{n,m+1}$),-- |
| Line 49, Claim 13 | after "($V_{n,m}$);", insert --¶-- |
| Line 51, Claim 13 | after "activation;", insert --¶-- |
| Line 52, Claim 13 | delete "(Vn+l,m; Vn,m+i)" and insert --($V_{n+1,m}$; $V_{n,m+1}$)-- |
| Line 55, Claim 13 | after "controller;", insert --¶-- |
| Line 56, Claim 13 | delete "(Vn+l,m; Vn,m+i)," and insert --($V_{n+1,m}$; $V_{n,m+1}$),-- |
| Line 58, Claim 13 | delete "(Vn,m; Vn,m);" and insert --($V_{n,m}$; $V_{n,m}$);¶-- |
| Line 59, Claim 13 | delete "(Vn+l,m; Vn,m+i)," and insert --($V_{n+1,m}$; $V_{n,m+1}$),-- |
| Line 61, Claim 13 | delete "(Vn+1,m; Vn,m+i)" and insert --($V_{n+1,m}$; $V_{n,m+1}$)-- |
| Line 62, Claim 13 | after "and", insert --¶-- |

<u>Column 10</u>

| | |
|---|---|
| Line 10, Claim 20 | delete "(Vij)" and insert --($V_{i,j}$)-- |
| Line 11, Claim 20 | after "steps:", insert --¶-- |
| Line 12, Claim 20 | delete "(Vij)," and insert --($V_{i,j}$),-- |
| Line 14, Claim 20 | after "respectively;", insert --¶-- |
| Line 19, Claim 20 | after "algorithm;", insert --¶-- |